United States Patent [19]

Kroener et al.

[11] Patent Number: 5,369,164
[45] Date of Patent: Nov. 29, 1994

[54] AQUEOUS DISPERSION OR SOLUTION CROSSLINKING WITH DIVINYL ETHER

[75] Inventors: Hubertus Kroener; Uwe Dittrich; Alexander Zettl, all of Ludwigshafen, Germany

[73] Assignee: BASF Aktiengesellschaft, Ludwigshafen, Germany

[21] Appl. No.: 135,977

[22] Filed: Oct. 14, 1993

[30] Foreign Application Priority Data

Nov. 6, 1992 [DE] Germany ................ 4237438

[51] Int. Cl.$^5$ .............. C08L 51/06; C09J 133/08; C09J 133/10; B32B 7/12
[52] U.S. Cl. ................. 524/458; 525/183; 525/291; 525/296; 525/301; 525/308; 525/312; 525/302; 428/500; 427/487; 156/327
[58] Field of Search .......... 524/458; 525/312, 183, 525/296, 301, 302, 308, 291

[56] References Cited

U.S. PATENT DOCUMENTS

| | | |
|---|---|---|
| 3,810,468 | 5/1974 | Harper et al. . |
| 4,250,070 | 2/1981 | Ley et al. . |
| 4,396,738 | 8/1983 | Powell . |
| 4,412,039 | 10/1983 | Alberts et al. . |
| 4,433,095 | 2/1984 | Hombach et al. . |
| 4,617,354 | 10/1986 | Augustin et al. . |
| 4,663,377 | 5/1987 | Hombach et al. . |
| 4,744,852 | 5/1988 | Augustin et al. . |

FOREIGN PATENT DOCUMENTS

| | | |
|---|---|---|
| 0003516 | 8/1979 | European Pat. Off. . |
| 2558845 | 8/1985 | France . |
| 3112117 | 10/1982 | Germany . |
| 3521618 | 12/1986 | Germany . |
| 3807555 | 8/1988 | Germany . |
| 1235879 | 6/1986 | U.S.S.R. . |

*Primary Examiner*—Vasu S. Jagannathan
*Attorney, Agent, or Firm*—Oblon, Spivak, McClelland, Maier & Neustadt

[57] ABSTRACT

An aqueous dispersion or solution of a polymer obtained by free radical polymerization and comprising from 0.01 to 10% by weight of carboxyl groups —$CO_2H$ or sulfo groups —$SO_3H$ contains, as a crosslinking agent, a compound having at least two vinyl ether groups.

17 Claims, No Drawings

AQUEOUS DISPERSION OR SOLUTION CROSSLINKING WITH DIVINYL ETHER

The present invention relates to an aqueous dispersion or solution of a polymer which is prepared by free radical polymerization and comprises from 0.01 to 10% by weight of carboxyl groups —$CO_2H$ or sulfo groups —$SO_3H$, containing, as a crosslinking agent, a compound having at least two vinyl ether groups.

Copolymers which are used as adhesives are often crosslinkable copolymers. As a result of the crosslinking, the cohesion, i.e. the internal strength of the adhesives, increases whereas the adhesion with the substrate surfaces to be adhesively bonded generally decreases.

For crosslinking, a crosslinking agent which reacts with functional groups in the copolymer is generally added to the copolymers.

Possible crosslinking agents are, for example, polyisocyanates which react with hydroxyl or amino groups. DE-A-35 21 618 discloses corresponding aqueous adhesive formulations in which water-dispersed polyisocyanates are added, as crosslinking agents, to aqueous dispersions of copolymers obtained by free radical polymerization. Similar adhesive formulations are also described in U.S. Pat. No. 4,396,738 and DE-A-31 12 117.

However, the disadvantage of these aqueous formulations is the poor shelf-life. The polyisocyanate can therefore be dispersed in water and mixed with the copolymer only shortly before its use as a crosslinking agent.

A longer shelf-life can be achieved by reacting the isocyanate groups with blocking agents, for example oximes, caprolactam, phenols or dialkyl maleates. The blocked polyisocyanates obtained hydrolyze only to a minor extent in aqueous dispersion.

DE-A-38 07 555 relates to such an oxime-blocked diisocyanate which is dispersed in water and is suitable for adding to water-dispersed polymers.

However, crosslinking reactions occur only after elimination of the blocking agent at about 130° C. or higher.

Conventional aqueous adhesive formulations containing polyisocyanates as crosslinking agents therefore either have a poor shelf-life and can hence be used only as a 2-component system or undergo crosslinking only at elevated temperatures.

Aqueous dispersions which have a long shelf-life and crosslink at room temperature after removal of the solvent are disclosed in EP-A-3516. These dispersions contain polyhydrazides which react with carbonyl-containing monomers polymerized in the copolymer.

There is in principle a need for further dispersions crosslinking at room temperature, in order to be able to provide alternatives to polyhydrazide crosslinking. Furthermore, these dispersions should have good performance characteristics, for example good adhesion, in particular good wet adhesion to a very wide range of substrates, and good cohesion when used as an adhesive.

Divinyl ethers as crosslinking agents are disclosed in SU-A-1 235 879 and FR-A-2 558 845. According to SU-A-1 235 879, divinyl ethers are added to liquid, carboxylated rubber and the mixture is vulcanized at 80° C. According to FR-A-2 558 845, divinyl ethers as crosslinking agents are mixed with carboxyl-containing polyolefins at from 150 to 200° C. and suitable substrates are coated with the resulting mixture at from 200° to 250° C.

It is an object of the present invention to provide aqueous dispersions of crosslinkable polymers, which dispersions have a long shelf-life, contain a crosslinking agent and are crosslinkable at room temperature.

It is a further object of the present invention to provide aqueous adhesives, in particular contact adhesives, which have good cohesion and adhesion.

We have found that these objects are achieved by the dispersion or solution defined above and its use as an adhesive.

The crosslinking reaction of carboxyl- or sulfo-containing polymers with vinyl ethers presumably takes place in accordance with the following reaction scheme:

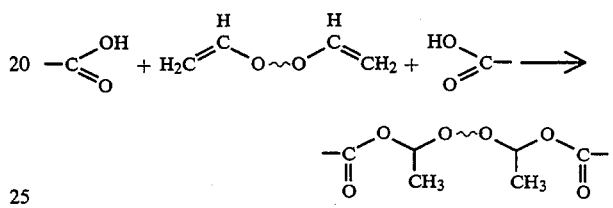

The carboxyl or sulfo group undergoes addition at the double bond of the vinyl ether.

The novel aqueous dispersions or solutions contain a polymer which is prepared by free radical polymerization and comprises from 0.01 to 10, preferably from 0.05 to 3, particularly preferably from 0.1 to 2, % by weight of carboxyl or sulfo groups.

The carboxyl or sulfo groups can be incorporated in said polymer, for example, by polymer-analogous reactions or free radical copolymerization of suitable carboxyl- or sulfo-containing compounds (referred to below as compounds a)).

For example, compounds a) which, in addition to at least one sulfo or carboxyl group, contain at least one further functional group, for example further carboxyl groups, anhydrides, primary or secondary amino groups, hydroxyl groups or epoxy groups, as additional functional groups are suitable (referred to below as functional compound $a_1$)).

The functional compound can be reacted with appropriately functionalized polymers, for example a compound having a carboxyl or anhydride group as an additional functional group reacts readily with primary or secondary amino groups in the polymer chain. A compound having an epoxy group as an additional functional group also reacts readily with hydroxyl groups or primary or secondary amino groups in the polymer main chain.

Carboxyl or sulfo groups are incorporated into the polymer obtained by free radical polymerization preferably by copolymerizable ethylenically unsaturated monomers which contain at least one carboxyl or sulfo group (referred to below as monomers $a_2$)).

Examples of monomers $a_2$) are acrylic acid, methacrylic acid, maleic acid, fumaric acid or vinylsulfonic acid.

In addition to the compounds a), the polymer obtained by free radical polymerization may contain main monomers b) polymerizable by the free radical method and, if required, further secondary monomers c) polymerizable by the free radical method, which have no carboxyl or sulfo groups.

Suitable monomers b) are esters of acrylic or methacrylic acid with alkyl alcohols of 1 to 20 carbon atoms. Examples of said alcohols are methanol, ethanol, n-propanol, isopropanol, n-butanol, sec-butanol, tert-butanol, n-pentanol, isoamyl alcohol, n-hexanol, octanol, 2-ethylhexanol, lauryl alcohol and stearyl alcohol.

Good results are obtained with alkyl (meth)acrylates having a $C_1$-$C_{10}$-alkyl radical, such as methyl methacrylate, methyl acrylate, n-butyl acrylate, ethyl acrylate and 2-ethylhexyl acrylate.

Mixtures of the alkyl (meth)acrylates are also particularly suitable.

Vinyl esters of carboxylic acids of 1 to 20 carbon atoms, such as vinyl laurate, stearate, propionate and acetate, are also suitable.

Suitable vinylaromatic compounds of up to 20 carbon atoms are vinyltoluene, α- and p-styrene, α-butylstyrene, 4-n-butylstyrene, 4-n-decylstyrene and preferably styrene. Examples of ethylenically unsaturated nitriles are acrylonitrile and methacrylonitrile.

Vinyl halides are chlorine-, fluorine- or bromine-substituted ethylenically unsaturated compounds, preferably vinyl chloride and vinylidene chloride.

Examples of nonaromatic hydrocarbons having 2 to 8 carbon atoms and at least two conjugated olefinic double bonds are butadiene, isoprene and chloroprene.

The monomers b) may be used in particular as a mixture, especially for obtaining the desired glass transition temperatures of the copolymer.

Examples of further copolymerizable monomers c), i.e. those which differ from b), are esters of acrylic and methacrylic acid with alcohols of 1 to 20 carbon atoms which contain at least one further hetero atom in addition to the oxygen atom of the alcohol group and/or which contain an aliphatic or aromatic ring.

For example, 2-ethoxyethyl acrylate, 2-butoxyethyl (meth)acrylate, dimethylaminoethyl (meth)acrylate, diethylaminoethyl (meth)acrylate, aryl, alkaryl or cycloalkyl (meth)acrylates, such as cyclohexyl (meth)acrylate, phenylethyl (meth)acrylate or phenylpropyl (meth)acrylate, or acrylates of heterocyclic alcohols, such as furfuryl (meth)acrylate, are suitable.

(Meth)acrylamide and its derivatives substituted by $C_1$-$C_4$-alkyl at the nitrogen are also possible monomers c).

Monomers c) having hydroxyl functional groups, for example $C_1$-$C_{15}$-alkyl (meth)acrylates which are substituted by one or two hydroxyl groups, are also particularly important. Especially important comonomers having hydroxyl functional groups are $C_1$-$C_8$-hydroxyalkyl (meth)acrylates, such as n-hydroxyethyl, n-hydroxypropyl or n-hydroxybutyl (meth)acrylates.

Other examples are maleic anhydride and glycidyl (meth)acrylate.

The amount of the monomers b) in the polymer may be from 30 to 99.99, preferably from 60 to 99.9, particularly preferably from 80 to 99.5, % by weight; that of the monomers c) may be from 0 to 60, preferably from 0 to 30, particularly preferably from 0 to 10, % by weight.

The amount of the compounds a) is then chosen so that the amounts by weight of the monomers and, where relevant, of the functional compounds sum to 100%, and the polymer has the content of carboxyl or sulfo groups which is described above.

The glass transition temperature of the polymer is in general from −50° to +140° C. preferably from −30° to +100° C.

The glass transition temperature of the polymer can be determined by conventional methods, such as differential thermal analysis or differential scanning calorimetry (cf. ASTM 3418/82, midpoint temperature).

For use as an adhesive, in particular a contact adhesive, the glass transition temperature is preferably from −30° to +10° C. Suitable monomers b) in this case are in particular $C_1$-$C_{20}$-alkyl (meth)acrylates, preferably $C_1$-$C_8$-alkyl (meth)acrylates, if necessary as a mixture with vinylaromatics, preferably styrene.

The polymer can be prepared by conventional polymerization methods such as mass, emulsion, suspension or solution polymerization.

The polymer is preferably prepared by emulsion polymerization, the polymer being obtained as an aqueous dispersion.

In the emulsion polymerization, the monomers can be polymerized in a conventional manner in the presence of a water-soluble initiator and of an emulsifier at, preferably, from 30° to 95° C.

Examples of suitable initiators are sodium persulfate, potassium persulfate, ammonium persulfate, tert-butyl hydroperoxides, water-soluble azo compounds and redox initiators.

Emulsifiers used are, for example, alkali metal salts of relatively long-chain fatty acids, alkylsulfates, alkylsulfonates, alkylated arylsulfonates or alkylated diphenyl ether sulfonates.

Other suitable emulsifiers are reaction products of alkylene oxides, in particular ethylene oxide or propylene oxide, with fatty alcohols, fatty acids or phenol, or alkylphenols.

In order to adjust the molecular weight, regulators may be used in the polymerization. For example, —SH-containing compounds, such as mercaptoethanol, mercaptopropanol, thiophenol, thioglycerol, ethyl thioglycolate, methyl thioglycolate and tert-dodecyl mercaptan, are suitable.

The novel aqueous dispersion or solution contains, as a crosslinking agent, a compound having at least two vinyl ether groups

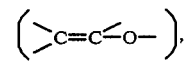

preferably two or three, very particularly preferably two, vinyl ether groups.

These are preferably vinyl ethers of the formula

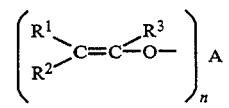 I where A is an n-valent linear or branched hydrocarbon chain of 2 to 40 carbon atoms which may be interrupted by from 1 to 19 nonadjacent oxygen, nitrogen or sulfur atoms or may be substituted or interrupted by one or two cycloaliphatic $C_5$-$C_{10}$ or aromatic $C_5$-$C_{12}$ ring systems, or is an n-valent cycloaliphatic $C_5$-$C_{10}$ or aromatic $C_5$-$C_{12}$ ring system and n may be an integer of from 2 to 6 and $R^1$, $R^2$ and $R^3$ independently of one another are each hydrogen or $C_1$-$C_4$-alkyl.

A is particularly preferably a linear or branched hydrocarbon chain of 2 to 25 carbon atoms which may be interrupted by from 1 to 12 nonadjacent oxygen atoms or is substituted or interrupted by a cyclohexyl or cyclohexylene ring.

n is preferably 2, 3 or 4.

n is particularly preferably 2.

$R^1$, $R^2$ and $R^3$ are each preferably hydrogen.

Examples of vinyl ethers are butanediol divinyl ether, hexanediol divinyl ether, pentaerythrityl tetravinyl ether, trimethylolpropane trivinyl ether, ethyleneglycol divinyl ether, tetramethylene glycol divinyl ether or 1,4-cyclohexanedimethanol divinyl ether.

Divinyl ethers of polyalkylene oxides, for example polyethylene oxides or polytetrahydrofurans, are also particularly suitable.

Polyacetals having terminal vinyl ether groups as readily formed, for example, by addition reaction of diols with divinyl ethers, are likewise suitable.

Vinyl ethers differing from formula I may also be used. For example, vinyl ethers of polyalkylene oxides or polyacetals having more than 40 carbon atoms in the hydrocarbon chain and an average molecular weight $M_n$ of up to 10,000, preferably up to 2,000 (determined by gel permeation chromatography using tetrahydrofuran as eluent and polystyrene as standard) are suitable. Other examples are vinyl ethers of polyesterdiols or hydroxyl-containing polymers obtained by free radical polymerization.

The vinyl ethers are known per se. They can readily be prepared by vinylation of the corresponding di- or polyalcohols with acetylene.

In general, the content of vinyl ether compounds in the novel dispersions or solutions is from 0.1 to 10, preferably from 0.1 to 5, % by weight, based on the polymer obtained by free radical polymerization.

The vinyl ether groups may also be used in a substantial excess or in an amount substantially less than the stoichiometric amount based on the carboxyl or sulfo groups.

The novel dispersions or solutions contain the vinyl ether compounds preferably in amounts such that there is a roughly equimolar ratio of the vinyl ether groups to the carboxyl or sulfo groups.

The solids content of the novel dispersion or solution is preferably from 20 to 90, in particular from 30 to 70, % by weight.

The novel dispersion or solution, in particular the dispersion, is suitable as a coating material for various substrates having plastic, wood or metal surfaces or, for example, for textiles, nonwovens, leather or paper. It is also suitable for applications in the building industry, for example as adhesives, sealing compounds, binders or the like. The coatings may be, for example, surface coatings, protective coatings or adhesive coatings.

The novel dispersion or solution may contain the conventional assistants and additives, depending on the intended use. These include, for example, fillers, such as quartz powders, quartz sand, finely divided silica, barite, calcium carbonate, chalk, dolomite or talc, which are often used together with suitable wetting agents, for example polyphosphates, such as sodium hexametaphosphate, naphthalenesulfonic acid or ammonium or sodium polyacrylates, in general from 0.2 to 0.6% by weight, based on the filler, of the wetting agents being added.

Fungicides for preservation are used, if desired, in general in amounts of from 0.02 to 1% by weight, based on the total dispersion or solution. Examples of suitable fungicides are phenol or cresol derivatives or organotin compounds.

The novel dispersion is particularly suitable as a sealing compound or adhesive, in particular as contact adhesives. When used as adhesives, the dispersions may furthermore contain, in addition to the abovementioned additives, specific assistants and additives conventionally used in adhesive technology. These include, for example, thickeners, plasticizers or tackifiers, for example natural resins or modified resins, such as rosin or synthetic resins, such as phthalate resins.

The novel dispersion or solution has a long shelf-life. The crosslinking reaction occurs at as low as room temperature on removal of the liquid phase, i.e. on volatilization of the water.

The volatilization of the water can be accelerated by increasing the temperature, for example to 30°–100° C.

When used as an adhesive, for example contact adhesive, adhesive bonds having high internal strength (adhesion) coupled with good adhesion to the substrates to be bonded are obtained.

When used as a coating material for leather, the wet rub fastness and the good flexing endurance of the coated leather are particularly noteworthy.

EXAMPLES

I Preparation of polymer dispersions D1 to D6

150 g of water were initially taken in a reaction vessel with a stirrer and two feed vessels. The feed vessels contained the following mixtures:

Feed 1:

550 g of monomer mixture according to Table 1

8.56 g of a 45% strength aqueous solution of a $C_{12}$-alkyldiphenyl ether sulfonate (Dowfax ® 2A1 from Dow Chemicals)

11.0 g of a 15% strength aqueous solution of sodium laurylsulfate 0.66 g of tert-dodecyl mercaptan 190 g of water Feed 2:

100 g of water 1.65 g of sodium peroxodisulfate

The initially taken mixture was heated to 85° C. and 1% by weight of feed 1 and 20% by weight of feed 2 were added while stirring. After initial polymerization for 15 minutes, feed 1 was added in the course of 150 minutes, only 40 g of feed 1 being introduced continuously in the first 15 minutes of the addition. The remainder of feed 1 was then added continuously in 135 minutes. Feed 2 was added continuously in 3 hours. At 85° C., polymerization was continued for about a further 2 hours and the mixture was then cooled. The pH was then brought to 7.0 with a 25% strength aqueous ammonia solution.

The polymer dispersions D1 to D6 were prepared in a similar manner.

TABLE 1

| Polymer dispersion | Copolymer composition Monomers in % by weight |
|---|---|
| D1 | 100 BA |
| D2 | 99.0 BA; 1.0 AA |
| D3 | 97.0 BA; 3.0 AA |
| D4 | 97.0 BA; 3.0 MAA |
| D5 | 99.0 BA; 1.0 DAAM |
| D6 | 97.0 BA; 3.0 DAAM |

Abbreviations:
BA: Butyl Acrylate
AA: Acrylic acid
MAA: Methacrylic acid
DAAM: Diacetoneacrylamide II Addition of crosslinking agents The amounts of crosslinking agents shown in Table 2 were added to 200 g of dispersions at room temperature while stirring, and stirring was continued for a further 1 hour at room temperature.

III Testing of performance characteristics

In order to test the performance characteristics, the dispersions or mixtures thereof were applied by knife coating in a weight of about 20 g/m² to polyester film (Hostaphan RN36, Hoechst) and the coated films were dried for 3 minutes at 90° C. in a through-circulation dryer. The coated films were then slit into 2 cm wide test strips.

To determine the shear strength (measure of cohesion), the adhesive strips were bonded over a 2.5 cm length to a chromium-plated V2A stainless steel test panel, rolled once with a roller with 2 kg, stored for 24 hours and then loaded at 23° C. by means of a suspended 2 kg weight. The measure of the shear strength was the time taken for the weight to fall off; the average of 3 measurements was calculated in each case.

In the determination of the peel strength (measure of adhesion), an adhesive strip was bonded to a chromium-plated V2A stainless steel test panel, rolled once with a roller weighing 1 kg and stored for 24 hours. It was then clamped with one end in the upper jaws of a tensile test apparatus. The adhesive strip was peeled off from the test surface (V2A stainless steel) at 300 mm/min at an angle of 90° and the force required for this purpose was measured. The measure of the peel value was the force in N which was obtained at an average of 3 measurements.

The loop value (measure of adhesion) was determined by test method No. 9 of the Fëderation Internationale des Fabricants Transformateurs d'Adhësifs et Thermocollants sur Papiers et Autres Supports (FINAT).

To determine the loop value, a 17.5 cm long and 2 cm wide test strip was clamped at both ends in the clamping jaws of a tensile test apparatus to form a loop, which was then brought into contact with the chromium-plated steel surface at a speed of 30 cm/min (lowering of the loop onto the chromium-plated steel sheet). After contact over the entire surface, the loop was immediately peeled off again and the maximum force in N was determined as a measure of the loop value.

The test figures PZ1 and PZ2 were used for evaluating the crosslinking effect. PZ1 is the product of peel strength and shear strength, and PZ2 is the product of the loop value, the shear strength and peel strength.

The results are likewise shown in Table 2.

Abbreviations:
BDDVE = Butanediol divinyl ether
CHDMDVE = Cyclohexanedimethanol divinyl ether
PTHF-DVE = Polytetrahydrofuran divinyl ether (molecular weight Mn about 400)
ADDH = Adipic dihydrazide

TABLE 2

| No. | Starting dispersion | Added crosslinking agent and amount (based on 200 g of dispersion) | Peel value [N] | Loop value [N] | Shear strength [h] | Test FIG. PZ1 (N · h) | Test FIG. PZ2 [N² · h] |
| --- | --- | --- | --- | --- | --- | --- | --- |
| 1 | D1 | — | 7.7 | 16.3 | 0.1 | 1 | 15 |
| 2 | D1 | 0.55 g BDDVE | 7.6 | 14.1 | 0.1 | 1 | 12 |
| 3 | D1 | 0.55 g CHDMDVE | 7.4 | 14.5 | 0.1 | 1 | 13 |
| 4 | D2 | — | 9.5 | 13.1 | 0.3 | 2 | 31 |
| 5 | D2 | 0.55 g BDDVE | 11.4 | 6.3 | 48.0 | 547 | 3447 |
| 6 | D2 | 0.55 CHDMDVE | 11.5 | 6.3 | 48.0 | 552 | 3478 |
| 7 | D3 | — | 15.1 | 6.0 | 1.4 | 21 | 124 |
| 8 | D3 | 0.55 g CHDMDVE | 6.5 | 4.3 | 48.0 | 312 | 1342 |
| 9 | D3 | 1.65 g CHDMDVE | 2.9 | 2.9 | 48.0 | 139 | 404 |
| 10 | D4 | — | 20.5 | 5.7 | 0.7 | 14 | 82 |
| 11 | D4 | 0.55 g PTHF-DVE | 8.3 | 5.3 | 48.0 | 398 | 2112 |
| 12 | D4 | 1.10 g PTHF-DVE | 6.2 | 2.7 | 48.0 | 298 | 804 |
| 13 | D4 | 2.20 g PTHF-DVE | 4.3 | 2.5 | 48.0 | 206 | 516 |
| 14 | D5 | — | 8.2 | 9.5 | 0.2 | 1 | 12 |
| 15 | D5 | 0.55 g ADDH | 3.9 | 3.4 | 48.0 | 187 | 636 |
| 16 | D6 | — | 10.7 | 8.9 | 0.2 | 3 | 23 |
| 17 | D6 | 1.10 g PTHF-DVE | 10.1 | 6.9 | 0.2 | 2 | 12 |
| 18 | D6 | 2.20 g PTH-DVE | 9.7 | 9.0 | 0.1 | 1 | 12 |

We claim:

1. An aqueous dispersion or solution of a crosslinkable polymer, crosslinkable at room temperature, prepared by free radical polymerization, comprising said polymer and a vinyl ether crosslinking agent containing at least two vinyl ether groups, wherein said polymer contains
   (a) ethylenically unsaturated monomer units having at least one COOH or SO₃H group;
   (b) 30–99.99 wt % of monomer units of at least one $C_1$-$C_{20}$-alkyl(meth)acrylate, vinyl ester of a carboxylic acid of 1–20 carbon atoms, vinyl aromatic of up to 20 carbon atoms, ethylenically unsaturated nitrile of 3–6 carbon atoms, vinyl halide, or non-aromatic hydrocarbon having 4–8 carbon atoms and at least two conjugated double bonds;
   (c) 0–60 wt % of monomer units of at least one additional ethylenically unsaturated monomer;
   wherein said polymer comprises 0.01–10 wt % COOH or SO₃H groups and the sum a+b+c=100 wt %.

2. The aqueous dispersion or solution of claim 1, comprising 0.1–10 wt % of said vinyl ether crosslinking agent.

3. The aqueous dispersion or solution of claim 2, comprising 0.1–5 wt % of said vinyl ether crosslinking agent.

4. The aqueous dispersion or solution of claim 1, wherein said vinyl ether crosslinking agent has the formula

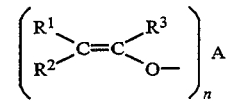

wherein A is a n-valent linear or branched aliphatic hydrocarbon chain of 2–40 carbon atoms, said hydrocarbon chain interrupted by 1–19 non-adjacent oxygen, nitrogen or sulfur atoms, said hydrocarbon chain substituted by or interrupted by one or two $C_5$-$C_{10}$ cycloaliphatic or $C_5$-$C_{12}$ aromatic ring systems, or A is an n-valent $C_5$-$C_{10}$ cycloaliphatic or $C_5$-$C_{12}$ aromatic ring system, n is an integer of 2–6 and $R^1$, $R^2$ and $R^3$, independently of one another, are hydrogen or $C_1$-$C_4$-alkyl.

5. The aqueous dispersion or solution of claim 4, wherein n is 2 or 3.

6. The aqueous dispersion or solution of claim 5, wherein n is 2.

7. The aqueous dispersion or solution of claim 4, wherein A is a linear or branched hydrocarbon chain of 2–25 carbon atoms, said hydrocarbon chain interrupted by 1–12 non-adjacent oxygen atoms, or said hydrocarbon chain substituted by or interrupted by a cyclohexyl or cyclohexylene ring.

8. The aqueous dispersion or solution of claim 1, wherein said vinyl ether crosslinking agent is selected from the group consisting of butanediol divinyl ether, hexanediol divinyl ether, pentaerythritol tetravinyl ether, trimethylolpropane trivinyl ether, ethyleneglycol divinyl ether, tetramethylene glycol divinyl ether and 1,4-cyclohexanedimethanol divinyl ether.

9. The aqueous dispersion or solution of claim 1, wherein said vinyl ether crosslinking agent is the divinyl ether of a polyalkylene oxide or a polyacetal having terminal vinyl ether groups.

10. The aqueous dispersion or solution of claim 1, comprising 60–99.9 wt % monomer units (b) and 0–30 wt % monomer units (c).

11. The aqueous dispersion or solution of claim 10, comprising 80–99.5 wt % monomer units (b) and 0–10 wt % monomer units (c).

12. The aqueous dispersion or solution of claim 1, wherein said polymer comprises 0.05–3 wt % COOH or $SO_3H$ groups.

13. The aqueous dispersion or solution of claim 12, wherein said polymer comprises 0.1–2 wt % COOH or $SO_3H$ groups.

14. The aqueous dispersion or solution of claim 1, wherein monomer units (a) are derived from a monomer selected from the group consisting of acrylic acid, methacrylic acid, maleic acid, fumaric acid and vinyl sulfonic acid.

15. The aqueous dispersion or solution of claim 1, wherein monomer units (c) are derived from esters of acrylic and methacrylic acid with alcohols of 1–20 carbon atoms which contain at least one additional heteroatom in addition to the oxygen atom of the alcohol group, which contain an aliphatic ring or which contain an aromatic ring, (meth)acrylamide, methacrylamide substituted at nitrogen with $C_1$-$C_4$-alkyl, $C_1$-$C_{15}$-alkyl(meth)acrylates substituted by one or two hydroxyl groups, maleic anhydride and glycidyl (meth)acrylate.

16. The aqueous dispersion or solution of claim 1, wherein monomer units (c) are derived from monomers comprising $C_1$-$C_{15}$-alkyl(meth)acrylates which are substituted by one or two hydroxyl groups.

17. The aqueous dispersion or solution of claim 16, wherein said monomer units (c) are derived from monomers comprising $C_1$-$C_8$-hydroxyalkyl(meth)acrylates.

* * * * *